United States Patent
Barma

Patent Number: 5,743,027
Date of Patent: Apr. 28, 1998

[54] RUBBER FOOTWEAR AND METHOD OF MAKING SAME

[76] Inventor: Tarachand S. Barma, 134 S. 29th St., Lacrosse, Wis. 54601

[21] Appl. No.: 563,986

[22] Filed: Nov. 29, 1995

[51] Int. Cl.⁶ .................................................. A43B 1/10
[52] U.S. Cl. .................... 36/4; 36/14; 36/17 R; 12/142 E; 12/142 D
[58] Field of Search .................... 36/4, 98, 14, 17 R; 12/142 E, 142 D

[56] References Cited

U.S. PATENT DOCUMENTS

| | | |
|---|---|---|
| 822,692 | 6/1906 | Schaffer . |
| 992,515 | 5/1911 | Mulconroy et al. . |
| 1,271,707 | 7/1918 | Heiser et al. .................... 36/4 |
| 1,924,716 | 8/1933 | Ferrettie .......................... 36/4 |
| 2,048,185 | 7/1936 | Dorogi et al. .................... 36/4 |
| 2,317,879 | 4/1943 | Bingham . |
| 2,317,880 | 4/1943 | Bingham . |
| 2,546,553 | 3/1951 | Majtner . |
| 2,742,389 | 4/1956 | Riley et al. . |
| 2,983,643 | 5/1961 | Seiberling . |
| 3,271,887 | 9/1966 | Werman . |
| 3,273,263 | 9/1966 | Klima . |
| 3,742,623 | 7/1973 | Groothaert . |
| 3,925,529 | 12/1975 | Bernier et al. .................. 36/134 X |
| 4,130,947 | 12/1978 | Denu . |
| 4,228,600 | 10/1980 | Krug et al. . |
| 4,245,406 | 1/1981 | Landay et al. . |
| 4,366,634 | 1/1983 | Giese et al. . |
| 4,455,765 | 6/1984 | Sjosward . |
| 4,703,533 | 11/1987 | Barma . |
| 5,546,680 | 8/1996 | Barma et al. . |

FOREIGN PATENT DOCUMENTS 2494568  5/1982  France ........................ 36/98

*Primary Examiner*—Ted Kavanaugh
*Attorney, Agent, or Firm*—M. Paul Hendrickson

[57] ABSTRACT

A rubber footwear product and method of making such products is provided. The rubber footwear product includes a molded rubber midsole having an integrally formed raised rubber welt portion around its periphery. By molding in a compression mold, injection mold, or the like, the midsole and welt may be formed in a variety of designs and will be accurately formed in the desired size and shape. The molded midsole is made of substantially cured rubber, and is secured to an uncured rubber upper by applying an uncured rubber coating onto the midsole and then vulcanizing to form a unitary rubber footwear subassembly. To this subassembly may separately be secured a variety of compositionally different outsoles made of various materials, and having various colors, designs, and specific utilities. The outsole may be attached to the subassembly by vulcanization, by conventional shoemaking cementing processes using adhesive compositions, or by injection molding directly onto the molded midsole.

19 Claims, 3 Drawing Sheets

RUBBER FOOTWEAR AND METHOD OF MAKING SAME

FIELD OF THE INVENTION

This invention relates generally to rubber footwear products and the manufacture thereof; and more particularly to the manufacture of rubber footwear products comprising a vulcanized assembly of a rubber upper portion and a midsole which may be separately combined with an outsole to form a rubber footwear product.

BACKGROUND OF THE INVENTION

In the conventional method of manufacturing rubber footwear products, uncured rubber or rubber coated fabrics are typically milled or extruded into sheets of desired thicknesses from which the properly sized component parts of the footwear product are cut. The uncured components are normally assembled upon a forming device, known as a last. The last bears the internal shape and size of the desired footwear product and is normally made of a heat conducting metal. Thus, a typical last will appear as a hollowed shoe or boot-shaped aluminum form. In the conventional manufacturing method, an uncured rubber upper portion, an uncured conventional rubber insole, an uncured foxing band (e.g., a flat uncured strip), an uncured rubber binder (e.g., uncured sheeting stock or filler), and an uncured or pre-cured rubber sole are assembled upon the forming last. Natural or synthetic uncured or unvulcanized rubber footwear components are normally sufficiently tacky to permit the initial assembly of the components upon the forming last. The footwear assembly is then vulcanized to provide the completed rubber footwear product.

A typical prior art method for constructing a rubber footwear product is, therefore, as follows. An insole is put upon the last and an uncured shoe or boot upper is positioned so as to adhesively overlap the insole. An uncured foxing band, or flat band of rubber (e.g., 1–2 inches in width), is then placed around the outer periphery or rim of the rubber upper. An uncured binder or filler is then placed unto the insole. The binder or filler will not normally extend beyond the exposed surface of the insole. An uncured rubber outsole is then wrapped over the projecting edge of the insole onto the uncured rubber upper. The resulting uncured rubber assembly (which has the appearance of a crudely formed footwear product) is then vulcanized upon the last, typically for about 1–2 hours at temperatures ranging from about 250°–350° F., to form the final footwear product. In the vulcanizing process, the component parts of the rubber footwear product are chemically and physically melded into a complete footwear product of unitary construction.

A typical uncured rubber formulation which is used for the rubber footwear components includes ethylenically unsaturated polymeric substances in combination with conventional vulcanization or curative additives. Conventional additives include cross-linking reagents such as sulfur, accelerators, tackifiers, antioxidants, activators, etc. The additives permit the uncured rubber formulation to be vulcanized into a cured rubber product. The additives and polymeric rubber substances are typically mixed in a Branbury mixer and then formed into the desired thickness or shape of the footwear component parts. This may be accomplished without curing the rubber formulation by various milling, extruding, calendaring, etc. techniques.

Vulcanization of uncured footwear components alters the chemical and physical attributes of the rubber composition by cross-linking the ethylenically unsaturated polymeric linkages with the cross-linking reagent. Cross-linkage occurs both within the individual component parts and between those parts as the ethylenically unsaturated polymeric molecules positioned at the interface of the overlapped component parts become cross-linked. Thus, vulcanization melds the component parts into a rubber product of unitary construction.

Conventional methods of manufacturing rubber footwear products necessitated vulcanization of the entire assembly of component parts. This manufacturing method placed severe constraints upon the rubber footwear manufacturing industry. Thermoplastic and other natural or synthetic polymeric substances could not be used in such a manufacturing process, due to the fact that they are either thermally sensitive or otherwise degrade upon vulcanization. Thus, outsoles for rubber footwear were essentially limited to those of a vulcanized rubber construction. Such a constraint made it difficult for the rubber footwear industry to effectively compete against footwear products made using other manufacturing methods. Other manufacturing methods permitted more fashionable designs (e.g., high-heeled shoes, western boots, contrasting sole colors, etc.) to be manufactured at a low cost. Footwear of a light weight construction, footwear having replaceable or repairable soles, or soles specially adapted for specific uses (e.g., spiked, cleated or ridged soles used for golf, football, hiking, baseball, etc.) or other specialty wear features were not feasibly made using the existing rubber footwear manufacture technology.

In U.S. Pat. No. 4,703,533, issued to Tarachand S. Barma, and incorporated herein by reference, a rubber footwear product was disclosed which is suitably adapted to separately receive an outsole. This rubber footwear product, and its method of manufacture, affords significant labor, equipment, production time, and material savings in rubber footwear production. It has also enabled the rubber footwear industry to incorporate many of the desirable attributes of other footwear products into a rubber footwear product, while preserving many of the desirable attributes of rubber footwear such as resistance toward air, gas, sunlight, hydrocarbon, moisture penetration, fats and oils, acid and other chemicals, along with its excellent durability of wear, strength, elasticity, electrical and heat insulation, and structural integrity properties. The footwear product disclosed in Barma includes a vulcanized assembly of rubber components, including a rubber upper portion, a rubber insole, and a rubber coated midsole article to which may be separately secured an outsole which is compositionally different from the rest of the footwear product. An uncured rubber welt may be included into the overall uncured assembly of uncured components. The inclusion of the uncured rubber welt significantly enhances the structural integrity, strength, water resistance and wear properties of the rubber footwear product.

The basic process of manufacturing a rubber footwear product as disclosed in the Barma patent is as follows. An uncured rubber insole is first placed on the top of a forming last. An uncured rubber upper portion is then placed on the last such that it overlaps the uncured rubber insole. The uncured rubber welt, which is an extruded product having an essentially T-shaped or 3-edged cross-section, is then cemented and affixed in place around the periphery of the insole, overlapping onto the uncured rubber upper portion. A midsole article is then placed onto the rubber welt and the insole. The resulting uncured assembly is then vulcanized to provide an intermediate footwear assembly.

The midsole article must be constructed of a material capable of withstanding the relatively high temperatures needed to vulcanize the uncured rubber components. Thus, the midsole article may be milled, cut, or stamped into the desired size from a sheet of vulcanized rubber material of the desired midsole thickness. The top and bottom surfaces of the midsole article are roughened, or abraded, and an uncured rubber coating is applied to one side of the midsole to impart sufficient adhesive tack to permit adhesive bonding and vulcanization of the midsole article to the rubber welt and insole. This results in a vulcanized rubber footwear assembly of unitary construction.

The other side of the midsole provides an interfacing surface for a separately secured outsole. A compositionally different outsole may thus be applied to the vulcanized footwear assembly. Such outsoles may be vulcanized, injection molded, or otherwise secured using an adhesive compound to the midsole of the vulcanized assembly. If an adhesive compound is used, the outsole may be repairable or replaceable. A multitude of outer soles differing in color, design, and functional utility may thus be secured to the assembly.

The method of manufacturing rubber footwear disclosed in the Barma patent obviates the need for manufacturing the complete footwear product in a single vulcanization step. The Barma patent discloses the use of a midsole base product in the manufacture of rubber footwear to which a variety of outsoles may be applied. This represents a significant advance in the style, design, and utility possibilities of rubber footwear, while retaining the desired attributes of such footwear. The midsole base product disclosed, however, does have certain limitations. For example, the midsole is typically cut from a sheet of vulcanized rubber material, often using hand-operated cutting machines. There thus will inevitably be unintentional variations in the size of midsole articles which are nominally the same size. Another limitation of the rubber footwear assembly method disclosed in Barma is the multiplicity of steps required to assemble the footwear components on the last. In particular, though the use of a rubber welt is highly desirable as a decorative feature and to more securely bind the upper to the midsole, the positioning of an extruded uncured rubber welt around the outer edge of the footwear is a tedious and time-consuming operation which must be performed by hand. Although the use of one piece midsoles incorporating integral welt members are known in the art of shoe construction (see, e.g., U.S. Pat. No. 3,271,887, to Werman), such a unitary midsole product has never been successfully applied to rubber footwear manufacture. In particular, such a unitary midsole has never been applied to a rubber footwear assembly method, such as described in the aforementioned patent to Barma, wherein the midsole article is used as the base of a unitary vulcanized footwear assembly to which may be secured a variety of outsoles.

SUMMARY OF THE INVENTION

In accordance with the present invention, an improved rubber footwear product, and an improved method for manufacturing such a product, is presented. The rubber footwear product of the present invention includes a rubber upper portion to which is secured a molded rubber midsole. The midsole is preferably compression molded, but may be made using other molding techniques such as injection molding. The midsole includes a raised welt portion around the periphery of the midsole, whose size and shape is defined by the contours of the mold in which it is made. The rubber upper portion and molded insole with raised welt portion are vulcanized together to form a rubber footwear product subassembly of unitary construction. To this vulcanized rubber footwear assembly outsoles of various designs and made of a variety of materials, including light weight materials of various colors and styles, may be secured.

The improved method of assembling a rubber footwear product in accordance with the present invention begins with hand-plying an uncured rubber upper portion onto a metal forming last, such as of aluminum, thereby forming a rubber upper portion of the footwear product. The upper portion may include a cushioning insole and cloth lining. The midsole article to be attached to the upper is made from rubber using a mold such as a compression mold. The contours of the mold cavity define the shape, thickness, height, and width of the midsole. Since each midsole produced in the mold will be identical, there will be almost no variation in the size of the midsoles produced. Thus, the potential for size variation and associated quality loss, resulting from the hand cutting of midsole articles from sheets of cured rubber material, is eliminated. The molded rubber midsole may be substantially or fully cured during the molding process. After removal from the mold, the midsole product is preferably roughened or abraded on both top and bottom surfaces of the midsole. The top surface of the midsole is then chemically treated and a coating of uncured rubber is applied. The prepared midsole article may then be affixed to the bottom of the uncured rubber upper.

The midsole article includes an integrally formed raised welt portion which extends vertically from the top surface of the midsole and which defines the outer periphery of the midsole. The shape and size of the raised welt portion is also defined by the contours of the mold cavity in which the midsole is formed. The inner side wall surface of the welt portion is roughened and coated with uncured rubber in the same manner as the top surface of the midsole. The midsole is then positioned on the last so that the inner side wall of the welt portion is in contact with the rubber upper around the periphery of the footwear product. Thus, the separate step of applying an extruded rubber welt around the outer periphery of the footwear upper is eliminated from the manufacturing process.

The uncured rubber assembly of upper, midsole, and uncured rubber coating is then vulcanized, resulting in a vulcanized rubber footwear product subassembly of unitary construction to which may be affixed a variety of outsoles. An outsole may be secured to the rubber footwear product using conventional shoemaking cementing processes and adhesive compounds. Alternatively, an outsole may be formed on the midsole of the rubber footwear product using an injection molding process. This is accomplished by lowering the midsole of the vulcanized rubber footwear product subassembly into an injection mold cavity, and then injecting the outsole compound directly into the mold cavity and onto the midsole. Thus, outsoles which are compositionally different from the vulcanized rubber assembly and in a wide variety of designs, colors and styles, may be applied to the rubber footwear product.

In accordance with the present invention, a midsole article used in the assembly of a rubber footwear product is molded out of rubber as a one piece unit. Molding of the midsole may be done in a compression mold, injection mold, or other similar device. Vertical sidewalls and horizontal extensions of the midsole form a raised rubber welt portion. The size and shape of the welt can be varied infinitely depending on the design of the mold in which the midsole is made. Since the midsole is a molded product, a greater potential for creativity in midsole design is possible. This cannot be easily achieved in an extended form using an extruded uncured rubber welt. The method of the present invention for assembling a rubber footwear product using the molded midsole article also simplifies the rubber footwear manufacturing process by eliminating the additional assembly step of placing an extruded uncured rubber welt around the periphery of the footwear product. Use of a molded midsole also reduces the cost of manufacture, and improves the consistency and quality of the midsole, and of the footwear product as a whole. Consistency and quality is improved by eliminating size variations and assembly defects resulting from hand cutting of the midsole from sheet material, and hand placement of the welt. The midsole can be produced in a variety of hardnesses by varying the composition of the rubber compounds from which it is made.

DETAILED DESCRIPTION OF THE INVENTION

Figure 1:
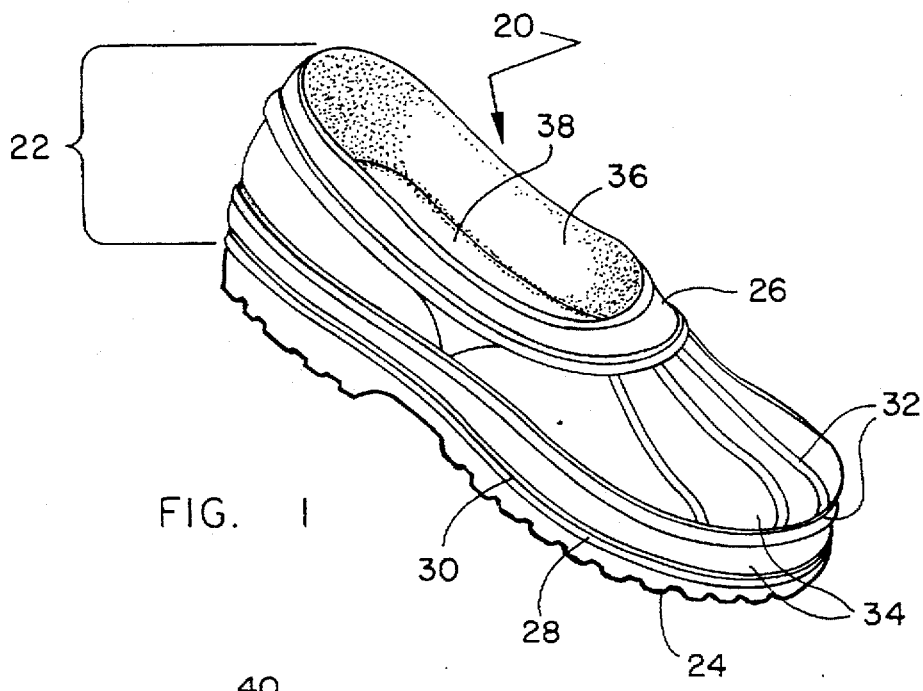
FIG. 1 is a perspective side view of a rubber footwear product manufactured in accordance with the present invention.

A rubber footwear product in accordance with the present invention is shown generally at 20 in FIG. 1. The rubber footwear product 20 includes a vulcanized rubber subassembly 22 to which is separately secured an outsole 24. The vulcanized rubber subassembly 22 includes a rubber upper portion 26 and a molded rubber midsole 28. The upper 26 and midsole 28 are joined together at the bottom surface of the upper 26 and top surface of the midsole 28. The upper 26 and midsole 28 are also joined together around the lower periphery of the upper 26 by a raised welt portion 30 of the midsole 28. As described in more detailed below, the upper 26 and midsole 28 are vulcanized together to form the vulcanized subassembly 22 which is of unitary construction.

The upper portion 26 may preferably include decorative bands of rubber material 32 and a patterned outer surface 34 to enhance the aesthetic appearance of the footwear product 20. The decorative bands 32 and texture 34 may be formed using conventional and well-known rubber footwear manufacturing techniques. The upper portion 26 also preferably includes a liner material 36 on the inside of the upper 26. The liner 36, which may preferably be made of cloth or other similar material, provides a more comfortable footwear product. The liner 36 may, if desired, be omitted. An insole 38 may be included as part of the upper portion 26, at the bottom of the inside of the upper 26. The insole 38 is preferably included as part of the upper 26 to provide insulation and comfort for the wearer of the footwear product 20. The insole 38 may be made of rubber, cloth, or other cushioning material and may preferably be covered, as shown in FIG. 1, by the liner 36 of the upper 26.

Figure 2:
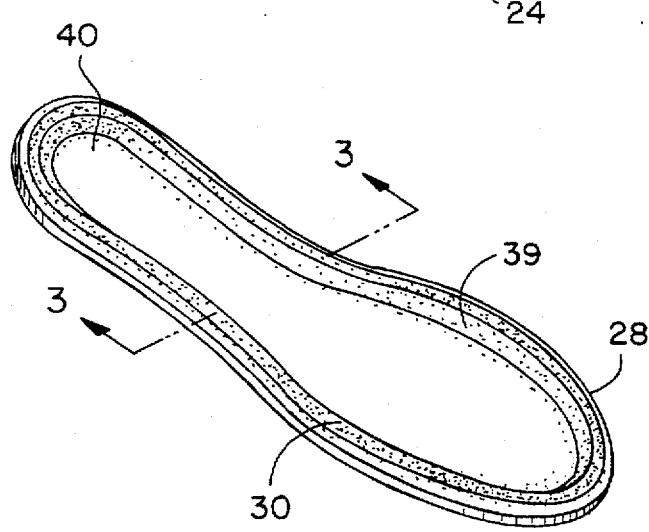
FIG. 2 is a perspective top view of a one piece molded midsole article used in the manufacture of the rubber footwear product of FIG. 1.
Figure 3:
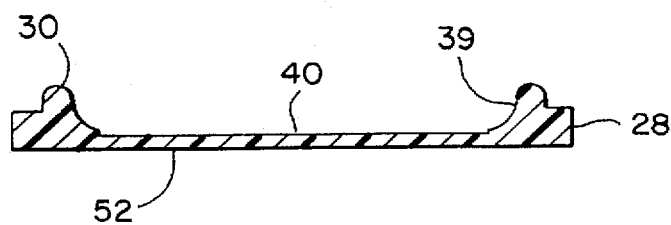
FIG. 3 is a cross-sectional view of the molded midsole article take along the line 3—3 of FIG. 2.

Although a relatively conventional rubber upper portion 26 may be used to form a rubber footwear product 20 in accordance with the present invention, the combination of the upper 26 with the molded midsole 28 provides a unique and improved footwear product 20 which may be more easily, inexpensively, and accurately assembled than previously known rubber footwear products. An exemplary molded midsole 28, which may be used to form the footwear product 20 of the present invention, is shown in perspective in FIG. 2 and in cross-section in FIG. 3. The midsole 28 is a molded product, made in a compression mold, injection mold, or the like, which includes, around its peripheral edge, a raised portion 30 forming a welt. The welt portion 30 permits vulcanization bonding of a portion of the peripheral side edge of the upper portion 26 to the midsole 28. This significantly enhances the structural integrity, strength, water resistance and wear properties of the rubber footwear product 20. The raised welt portion 30 preferably includes an inner side wall 39 which forms a smooth contoured cavity on the top surface 40 of the midsole 28. When the footwear product 20 is assembled, the bottom of the upper 26 and the insole 38 will fit within the side wall 39 into the cavity formed in the top surface 40 of the midsole 28.

The midsole 28 is made from rubber which is molded in a compression mold or other type of mold to a definite shape, thickness, height and width as defined by the contours and design of the mold cavity. A typical midsole 28 will have a thickness of ⅛ inch to ⅜ inch in the center of the midsole 28. The total vertical height of the welt portion 30 of the midsole 28 may typically be ⅛ inch to ¾ inch. The welt portion 30 may typically extend horizontally ⅛ inch to ⅜ inch from the edges of the central cavity on the top surface 40 of the midsole 28 formed by the welt side wall 39. These dimensions are, of course, only exemplary. An infinite variety of midsole dimensions are possible.

Figure 4:
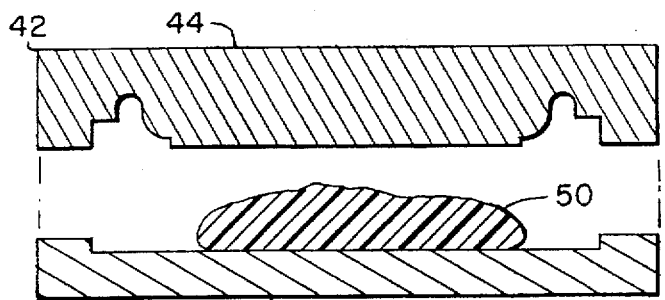
FIGS. 4–6 are illustrative cross-sectional views of a compression mold and rubber material, which illustrate the process of producing a molded midsole as shown in FIG. 2.
Figure 5:
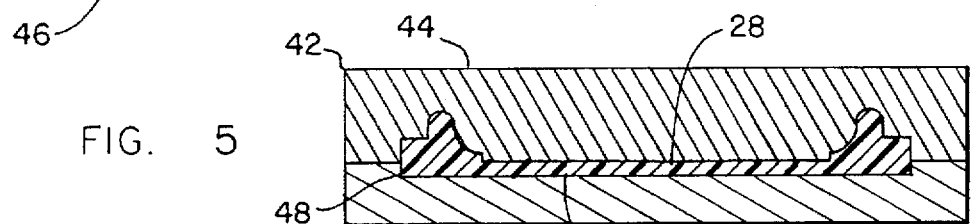
Figure 6:
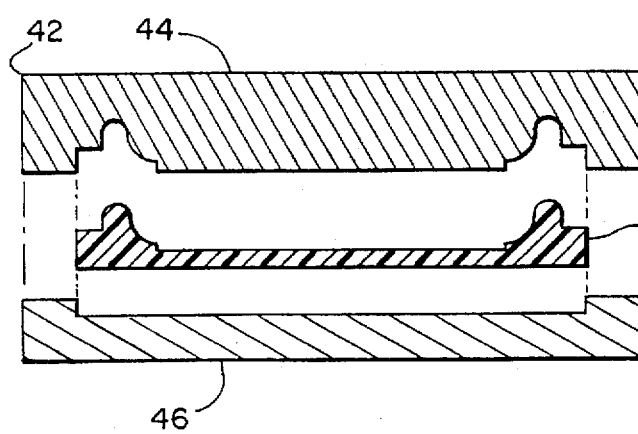

The exemplary process of forming the midsole 28 in a compression mold 42 is described with reference to illustrative FIGS. 4–6. It should be noted that the midsole 28 may be formed in other types of molds, such as an injection mold, as well. The compression mold 42 may be of conventional design, including an upper portion 44 and a lower portion 46 which, when brought together, define a mold cavity 48 between them. The contours of the upper portion 44 and lower portion of the mold 42 define the shape of the cavity 48 and, therefore, of the midsole 28 which is formed in the cavity. Clearly, an infinite variety of cavity contours and sizes may be implemented in a compression mold 42, and, therefore, an infinite number of differently shaped and sized midsoles 28 may be formed. In particular, various different welt shapes may be defined by the cavity 48 Of the compression mold 42 to achieve different aesthetic and structural features for the midsole 28 and the rubber footwear product 20 as a whole. Moreover, each midsole 28 produced on the mold 42 will be identical in size and shape. Such consistency will increase the quality of the final rubber footwear product 20. The compression mold 42 is also capable of applying heat to rubber material placed in the cavity 48, to thereby cure, or partially cure, the midsole 28.

Formation of the midsole 28, with integral raised welt portion 30, begins by placing an uncured rubber material 50 into the compression mold 42. A wide variety of known natural and synthetic rubbers may be used. Illustrative of typical synthetic rubbers are butyl rubber, cispolyisoprene, neoprene, Buna N, ethylene and/or propylene/neoprene and/ or butadiene/bicycloheptadiene copolymerizates, etc., mixtures thereof, and the like. It is apparent that the midsole 28 can be made in a variety of hardnesses and colors (including multiple colors) by varying the composition of the rubber components used.

The two halves 44 and 46 of the compression mold 42 are then closed around the uncured rubber 50. When the compression mold 42 is closed, the rubber 50 fills the cavity 48 formed in the compression mold 42. The rubber 50 thus conforms to the shape of the cavity 48, and is thereby formed into the desired shape of the midsole 28. The temperature of the compression mold 42 is then raised to cure, or partially cure, the rubber 50. The duration in which the rubber 50 is in the heated compression mold 42 determines whether the rubber will be fully or partially cured. Preferably, the midsole article 28 is at least 80% cured before the mold 42 is opened and the midsole 28 is removed.

After the midsole 28 is removed from the compression mold 42, the top surface 40, bottom surface 52, and inner sidewall surface 39 of the raised welt portion 30 are preferably mechanically roughened or abraded. The surfaces may preferably be roughened by abrading with a wire brush, a coarse emery wheel, or course sandpaper (e.g., 60–80 grit) lengthwise and crosswise across the surfaces of the midsole 28. Such roughening tends to create a multiplicity of macroscopic projections or appendages on the midsole surfaces which are effective in helping to firmly anchor the midsole 28 to the upper portion 26 and to the outsole 24.

Figure 7:
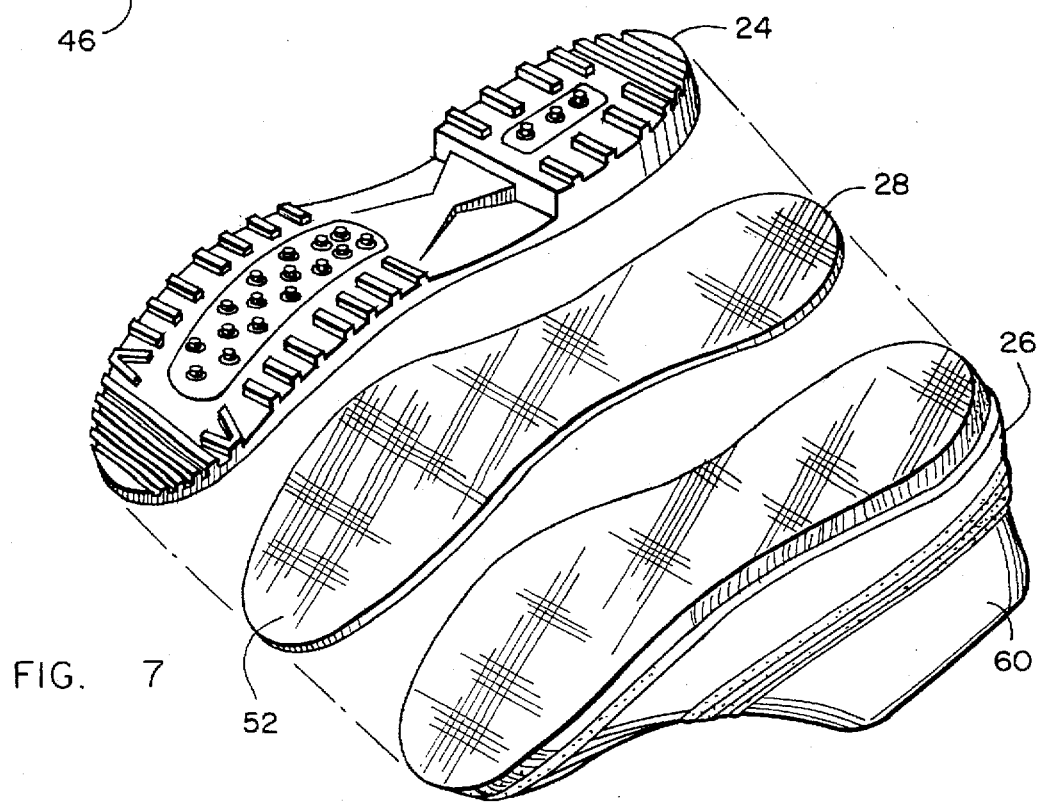
FIG. 7 is an exploded perspective view of the components of a rubber footwear product in accordance with the present invention, including an upper portion mounted on a forming last, a midsole, and an outsole.
Figure 8:
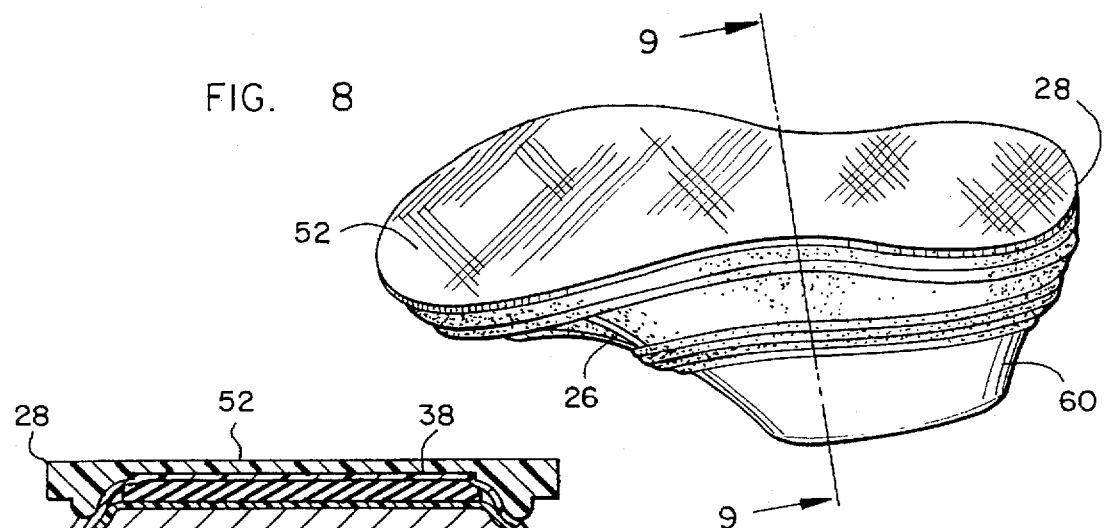
FIG. 8 is a perspective view of an intermediate rubber footwear subassembly including a molded midsole article secured to an upper portion which is mounted on a forming last.
Figure 9:
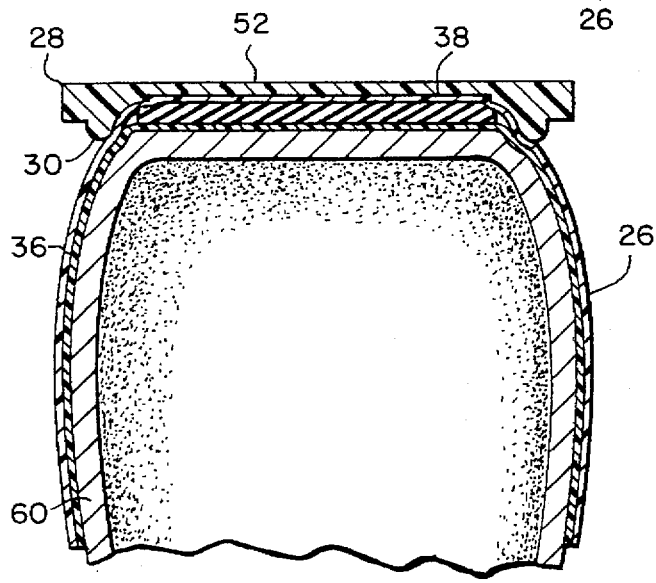
FIG. 9 is a cross-sectional view of the rubber footwear subassembly taken along the line 9—9 of FIG. 8.

A process employing the molded midsole 28, having integrally formed welt portion 30, to form a rubber footwear product 20 in accordance with the present invention, is described with reference to FIGS. 7–9. An uncured rubber upper portion 26, including upper lining 36 and insole padding 38, is hand plied onto a forming last 60. The upper portion 26 may be made of any natural or synthetic rubber compound commonly used to form uppers in conventional rubber footwear manufacturing processes. The last 60 is typically, and preferably, made of a heat conducting metal such as aluminum. The midsole 28 is then adhesively applied to the upper 26 to form an uncured rubber footwear subassembly as shown in FIGS. 8 and 9. As shown, the upper 26 and insole 38 are positioned within the cavity formed on the surface 40 of the midsole 28 by the raised welt portion 30. The inner side wall 30 of the raised welt portion 30 of the midsole 28 is thus in contact with the sides of the upper 26 along the periphery of the subassembly.

Since the midsole 28 is already substantially cured, it cannot, by itself, be intervulcanized with the uncured upper 26. Coating the upper surface 40 of the midsole 28 and inner sidewall 39 of the raised welt portion 30 of the midsole 28 with uncured rubber will impart sufficient adhesive tack to permit adhesive bonding of the midsole 28 to the upper 26, while compositionally providing a layer of material which will intervulcanize with the uncured upper 26 to provide a vulcanized footwear assembly of unitary construction. Although the thickness of the uncured coating layer may vary, a coating of less than about 0.025 inches in thickness, and most typically less than 0.015 inches in thickness, will generally be sufficient to permit the midsole 28 to be intervulcanized with the upper 26.

The creation of a satisfactory uncured rubber coating layer on the inner side wall 39 and upper surface 40 of the midsole 28 may preferably be achieved using a multi-stage coating process. First, the surfaces are treated with a chemical which permits an uncured rubber coating to wet and adhere to the midsole 28. A chlorinating acid is preferably used for this purpose. The next stage is preferably effectuated by coating the midsole 28 with an uncured rubber latex. Finally, a second coat, or overcoat, of an uncured rubber solution is applied. Such a multi-stage coating process tends to significantly improve the wetting penetration and tenacity of the uncured rubber to the midsole 28, and thus, improves the ultimate structural integrity of the vulcanized footwear product 20.

The first coating layer of uncured rubber latex may preferably include an uncured natural or synthetic rubber uniformly dispersed throughout a polar dispersant such as water. Such latexes are typically formulated with conventional emulsifiers or surfactant systems (natural or synthetic) to emulsify finely divided or minute uncured rubber particles throughout an aqueous carrier, along with wetting agents, cross-linking agents (e.g., sulfur), tackifiers, and other conventional curable rubber latex additives. Conventional lower alkyl alcohols (e.g., ethanol, propanol, etc.) are frequently added to enhance the wetting and penetration of the uncured rubber molecules and curing reagents into the porous intercies of the midsole 28. Conventional coating techniques (e.g., spraying, brushing, dipping, etc.) may be used to uniformly apply the latex to the upper surfaces of the midsole 28. The volatile carrier or constituent (namely water) may then be removed by conventional drying techniques (e.g., air, oven, vacuum drying, etc.) conducted below the uncured rubber vulcanization temperature. The dry latex coating will thus form an uncured rubber film upon the upper surface 40 and sidewall surface 39 of the midsole 28.

The second coating of an uncured rubber solution may then be applied over the dry latex coating. A typical uncured rubber solution will preferably include a suitable rubber solvent or non-polar dispersant, an uncured rubber solute uniformly dispersed therein, plus cross-linking reagents, accelerators, wetting agents, and other conventional curative additives therefor. Solvents such as gasoline, benzine, chloroform, carbon tetrachloride, and carbon disulfide tend to swell uncured and cured rubbers. Thus, these solvents may be effectively utilized to enhance the penetration of the uncured rubber solution and vulcanization reagents into the dry latex coating on the midsole 28 and to provide a more uniform coating of the rubber molecules upon the surface of the midsole 28. An exemplary uncured rubber solution, having high bond strength and relaxation properties, may be prepared by uniformly mixing together, in a cement churn, an uncured rubber stock, isopropyl alcohol as a wetting agent, sulfur, hexane and heptane as cosolvents, and other conventional rubber curative additives (e.g., accelerators, activators, anti-oxidants, tackifier, etc.) in conventional concentrations. The uncured rubber solution may then be applied over the dry latex precoat by conventional techniques, such as those mentioned above for applying the latex coating. After the uncured rubber solution has been applied, excess solvent may be removed therefrom by conventional means such as vacuum, air, or oven drying, etc.

After the uniformly coated midsole 28 is properly affixed to the bottom of the uncured rubber upper 26, the resulting unvulcanized subassembly is vulcanized. The vulcanization process preferably proceeds for 1–1½ hours. Vulcanization effects a melding together of uncured rubber components, including, in this case, the uncured rubber upper 26 and the uncured rubber coating on the midsole 28. Thus, the midsole and upper will be joined into a unitary cured rubber assembly 22 as the uncured laminates between them are chemically altered into a unitary product by the vulcanization process.

A variety of outsoles 24 may be separately secured to the unitary vulcanized rubber subassembly, formed of the midsole 28 and upper portion 26, to form the complete rubber footwear product 20. The bottom surface 52 of the midsole 28 provides an interfacing surface substantially commensurate in size, shape, and surface area as the separately secured outsole 24. The midsole 28 may be molded such that the contour of the surface 52 of the midsole 28 is suitably matched to the upper interfacing surface of the outsole 24 to provide a firm base for the outsole 24. Preferably, the bottom surface 52 of the midsole 28 will be substantially flat, and molded so as to correspondingly match the outer dimension or periphery of the outsole 24.

In accordance with the present invention, the unitary vulcanized subassembly 22 may be combined with a variety of outsoles 24. The advantages of a rubber footwear product may thereby be combined with the flexibility offered by a variety of outsoles 24. The subassembly 22 may be initially manufactured, and a variety of fashionable or special purpose outer soles may be separately secured thereto at a later time. Also, the vulcanized subassembly 22 may be shipped from one manufacturing site to a second site at which the desired outsole 24 may be secured thereto. Since the midsole 28 is accurately and consistently made using a compression mold or other molding technique, the size of the midsole 28 will be consistent over many footwear articles, thus increasing the confidence that the separately manufactured outsoles 24 will match the midsoles 28 when assembled at a later time or at a remote location.

The outsole 24, may, of course, be made of a rubber material. In this case, to secure the outsole 24 to the midsole 28, the roughened bottom midsole surface 52 may be treated with the same latex precoat and uncured rubber solution overcoat which was applied to the inner midsole surface in the formation of the vulcanized subassembly 22. This will permit the affixing of the uncured outsole 24 via a vulcanization process. Alternatively, an outer sole 24 constructed of a non-rubber material which is capable of withstanding the vulcanization process may be coated with an uncured rubber solution and then intervulcanized with the midsole 28.

A variety of lightweight outsoles 24, such as made of polyurethane thermal plastic rubber (EVA) or composition rubber, may be secured to the midsole 28 using conventional shoemaking cementing processes. Thus, an outsole 24 may be secured to the rubber footwear subassembly 22 using an adhesive compound. The pretreated, i.e., roughed or abraded, bottom surface 52 of the midsole 28 affords a secure base to which an adhesive composition may be applied for firmly affixing or anchoring the outsole 24 to the vulcanized subassembly 22. Thus, in contrast to conventional rubber footwear products, which are normally discarded when the outsole becomes worn and unfit for further use, footwear products made in accordance with the present invention are repairable by replacing the worn outsole with a new outsole replacement using conventional shoe repair techniques.

Outsoles formed of a host of natural and/or synthetic materials may be made adaptable to the rubber footwear product of the present invention by adhesion in this manner. In general, the vulcanized subassembly 22 may be adapted to a wide variety of outsoles presently used in the construction of non-rubber footwear products. Exemplary outsoles include outsoles made of naturally occurring materials such as natural rubber crepe soles, leather soles, etc., as well as soles of a synthetic thermal plastic or thermoset construction, such as polyurethane, ethyl vinyl acetate, polyolefin, polyvinyl chloride, foamed thermoset and/or thermo plastic soles (e.g., macroscopic and microcellular) of an open or closed cellular construction, combinations thereof, and the like. Thus, the present invention affords a means for substantially reducing the overall weight of rubber footwear products by not necessarily limiting such footwear to a vulcanized rubber outsole.

The most appropriate adhesive for securing the outsole 24 to the midsole 28 will depend upon the composition and adhesive compatibility of the interfacing surfaces of the desired outsole 24 and the adhesive. The midsole 28 will generally be compatible with a broad range of those adhesives commonly used in securing outsoles in the shoe manufacture and repair trade. Exemplary adhesives include the thermoplastic hot melts, contact cements, polyurethane cements, epoxides, animal glues, rubber cements (e.g., the neoprene cements), mixtures thereof, and the like. The neoprene and polyurethane cements have been found to be particularly effective adhesives for rigidly and permanently securing outsoles to the midsole.

An outsole 24 may also be secured to the vulcanized subassembly 22 by an injection molding technique, whereby the outsole 24 is injected directly onto the midsole 28. Injection molding procedures are well-known in the art of footwear fabrication. The method of injection molding an outsole 24 onto the vulcanized assembly 22 is described briefly with reference to the illustrative cross-section of FIG. 10. The vulcanized upper 26, midsole 28, and last 60 are mounted onto an injection molding machine. The midsole 28 is then raised, or lowered, into the cavity 64 of the injection mold 66. The contours of the injection mold cavity 64 define the size and shape of the outsole 24 and may, of course, be of an infinite variety of shapes and designs. A molten mass of an uncured rubber base, thermoset plastic, or thermoplastic material (e.g., polyurethane), is then injected into the mold cavity 64 through an inlet port 68. The outsole 24 is thereby formed directly onto the midsole 28 as the injected material fills the mold cavity 64 and, when cooled, provides an outsole 24 securely affixed to the vulcanized subassembly 22. By this method, a multitude of different outsoles having different colors, designs, and functional utilities, may be firmly secured to the midsole 28.

Figure 10:
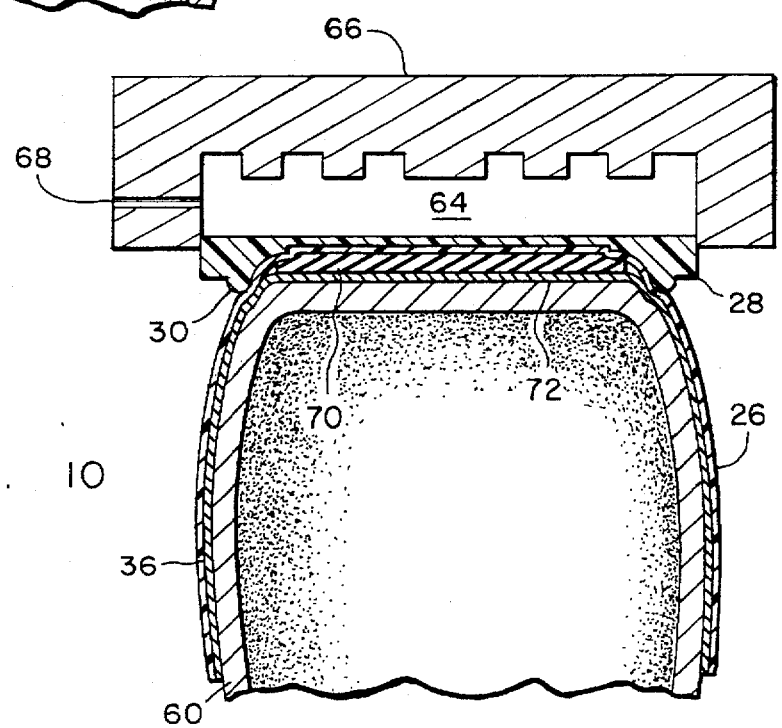
FIG. 10 is an illustrative cross-sectional view of an alternative embodiment of the rubber footwear subassembly mounted on an injection mold for injection molding an outsole into the subassembly.

Also illustrated in FIG. 10 is the fact that a variety of upper portions 26, having a variety of inner sole structures, may be used to form a rubber footwear product in accordance with the present invention. The upper portion 26 must interface with the midsole 28, and, particularly, the inner wall 39 of the raised welt portion 30. However, the upper portion 26 need not extend entirely across the top surface 40 of the midsole 28. An insole filler 70, made, e.g., of rubber or other material, may fill most of the cavity formed on the top surface 40 of the midsole 28 by the raised welt portion 30. Additionally, the insole may include multiple layers. For example, in FIG. 10, the insole includes filler layer 70 and a second padded insole layer 72, which may be made of the same or different material as the first layer 70, located between the filler layer 70 and the liner 36 of the upper 26.

From the foregoing description, it is apparent that the present invention provides a new and improved rubber footwear product and method for making such products. The use of a molded midsole, including an integrally formed raised welt portion, allows a rubber footwear product to be assembled without the additional step of attaching a separately extruded rubber welt. Additionally, molding in a compression mold or other type of mold provides midsoles having high size and shape accuracy. Molding also affords greater potential for creativity in midsole and welt design. A variety of rubber compounds may be used to form the midsole, thereby permitting midsoles to be formed having various hardnesses, and even colors. The molded midsole is used in accordance with the present invention to form a unitary rubber footwear subassembly to which may be secured a variety of outsoles made of a variety of materials, and having various colors, designs, and utilities.

It is understood that this invention is not confined to the particular embodiments described herein, but embraces all such modified forms thereof as come within the scope of the following claims.

What is claimed is:

1. A rubber footwear product, consisting essentially of
   a) a cured rubber upper portion;
   b) a molded rubber midsole vulcanizate having a bottom surface and a top surface equipped with an integrally formed raised welt vulcanizate portion extending vertically from the top surface of the midsole vulcanizate and extending around a periphery of the midsole vulcanizate, the size and shape of the midsole vulcanizate and raised welt portion thereof being determined by a contour of a cavity of a mold in which the midsole vulcanizate is formed, with the top surface of the midsole vulcanizate and an inner side wall of the raised welt vulcanizate portion of the midsole vulcanizate being bonded to the rubber upper portion by intervulcanization thereto; and
   c) an outsole secured to the bottom surface of the midsole.

2. The rubber footwear product of claim 1 wherein the rubber upper portion includes additionally an insole and a non-rubber liner.

3. The rubber footwear product of claim 1 wherein the molded rubber midsole vulcanizate consists essentially of a preformed compression molded rubber vulcanizate.

4. The rubber footwear product of claim 1 wherein the midsole vulcanizate is at least 80% cured before being secured to the rubber upper portion by vulcanizate.

5. The rubber footwear product of claim 4 wherein the interfacing surface of upper surface of the midsole vulcanizate and the inner side wall of the raised welt vulcanizate portion to said rubber upper include a roughened interfacing surface intervulcanized to said rubber upper with an interfacing rubber vulcanizate coating.

6. The rubber footwear product of claim 1 wherein the bottom surface of the midsole vulcanizate includes a roughened bottom surface and the outsole is adhesively bonded to the roughened bottom surface of the midsole vulcanizate with an adhesive composition.

7. The rubber footwear product of claim 1 wherein the outsole comprises an injection molded outsole molded onto the bottom surface of the midsole vulcanizate.

8. A rubber footwear product subassembly consisting essentially of
   a) a cured rubber upper portion; and
   b) a molded rubber midsole vulcanizate having a a bottom surface and a top surface fitted with an integrally formed raised welt vulcanizate portion extending vertically from the top surface of the midsole vulcanizate and extending around a periphery of the midsole vulcanizate, the size and shape of the midsole vulcanizate and raised welt vulcanizate portion thereof being determined by a contour of a cavity of a mold in which the midsole vulcanizate is formed, the top surface and an inner side wall of the raised welt vulcanizate portion of the midsole being intervulcanized to the rubber upper portion by an intervulcanized rubber coating layer interdisposed between the upper cured rubber portion and the inner side wall and the top surface of said midsole vulcanizate.

9. The rubber footwear product subassembly of claim 8 wherein the rubber upper portion includes additionally an insole and a non-rubber liner.

10. The rubber footwear product subassembly of claim 8 wherein the molded rubber midsole consists essentially of a pre-formed compression molded rubber vulcanizate.

11. The rubber footwear product subassembly of claim 8 wherein the interfacing surface of upper surface of the midsole vulcanizate and the side wall of the raised welt vulcanizate portion to said rubber upper include roughened interfacing surfaces intervulcanized to said rubber upper with an interfacing rubber vulcanizate coating.

12. The rubber footwear product subassembly of claim 8 wherein the bottom surface of the midsole includes a roughened bottom surface for securing an outsole to the midsole.

13. A method for making a rubber footwear product, comprising the steps of:
    (a) molding a rubber midsole in a mold, the midsole having a top surface and a bottom surface and including an integrally formed raised welt portion extending vertically from the top surface of the midsole and extending around a periphery of the midsole, the size and shape of the midsole and raised welt portion being determined by a contour of a cavity of the mold;
    (b) curing the midsole until the midsole is at least 80% cured;
    (c) lasting an uncured rubber upper portion;
    (d) applying an uncured rubber coating to the top surface of the midsole and an inner side wall of the raised welt portion;
    (e) affixing the coated midsole to the lasted upper portion so that the coated top surface of the midsole and the coated side wall of the raised welt portion are in contact with the uncured rubber insole;
    (f) vulcanizing the upper portion, the midsole, and the rubber coating to form a unitary rubber footwear product subassembly.

14. The method of claim 13 wherein the step of molding a rubber midsole is accomplished using a compressing mold.

15. The method of claim 13 comprising additionally the step of roughening the top surface of the midsole and the inner side wall of the raised welt portion prior to the step of applying the uncured rubber coating.

16. The method of claim 13 comprising additionally the step of separately securing an outsole to the bottom surface of the midsole of the unitary rubber footwear product subassembly.

17. The method of claim 13 comprising additionally the step of roughening the bottom surface of the midsole.

18. The method of claim 17 comprising additionally the step of separately securing an outsole to the bottom surface of the midsole of the unitary rubber footwear product subassembly using an adhesive composition.

19. The method of claim 13 comprising additionally the step of injection molding an outsole to the bottom surface of the midsole of the unitary rubber footwear product subassembly.

* * * * *